United States Patent
Ramana et al.

(10) Patent No.: US 10,498,591 B1
(45) Date of Patent: Dec. 3, 2019

(54) ISOLATING SERVICE FAULTS USING LOOPBACKS

(71) Applicant: Juniper Networks, Inc., Sunnyvale, CA (US)

(72) Inventors: Paleti Venkata Ramana, Bangalore (IN); Prabhu Raj V. K., Bangalore (IN); Vamsi Krishna A, Bangalore (IN); Viswanath K J, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 13 days.

(21) Appl. No.: 15/674,054

(22) Filed: Aug. 10, 2017

(51) Int. Cl.
*H04L 12/24* (2006.01)
*H04L 12/707* (2013.01)
*H04L 29/08* (2006.01)

(52) U.S. Cl.
CPC ...... *H04L 41/0681* (2013.01); *H04L 41/0659* (2013.01); *H04L 41/0803* (2013.01); *H04L 45/22* (2013.01); *H04L 67/34* (2013.01)

(58) Field of Classification Search
CPC ............. H04L 41/0681; H04L 41/0803; H04L 41/0659; H04L 45/22; H04L 67/34
See application file for complete search history.

(56) References Cited

U.S. PATENT DOCUMENTS

| | | | | |
|---|---|---|---|---|
| 8,406,143 B2* | 3/2013 | Long | ............... | H04L 12/4641 370/241.1 |
| 8,526,313 B1* | 9/2013 | Jones | ............... | H04L 43/10 370/249 |
| 2009/0219811 A1* | 9/2009 | Dolganow | ............... | H04L 43/08 370/231 |
| 2009/0285133 A1* | 11/2009 | Rao | ............... | H04B 7/2606 370/279 |

OTHER PUBLICATIONS

Wikipedia, "IEEE 802.1ag", https://en.wikipedia.org/wiki/IEEE_802.1ag, Jul. 22, 2015, 3 pages.
Juniper Networks, "IEEE 802.3ah OAM Link-Fault Management Overview", https://www.juniper.net/documentation/en_US/junos/topics/concept/interfaces-ieee-802-3ah-oam-link-fault-management-overview.html, May 8, 2017, 1 page.
Cisco, "Configuring Ethernet OAM (IEEE 802.3ah), CFM (IEEE 802.1ag, and E-LMI on the ML-MR-10 Card", https://www.cisco.com/c/en/us/td/docs/optical/15000r9_0/ethernet/454/guide/45490ethemetguide/45490a_eoamonmlmr.pdf, Apr. 4, 2009, 48 pages.
Wikipedia, "Ethernet in the first mile", https://en.wikipedia.org/wiki/Ethernet_in_the_first_mile, Jun. 21, 2017, 6 pages.

* cited by examiner

*Primary Examiner* — Feben Haile
(74) *Attorney, Agent, or Firm* — Harrity & Harrity, LLP

(57) ABSTRACT

A device may receive an indication to perform a loopback test to identify a source of a communication error among a set of devices. The device may configure a value in a data structure to permit identification of a set of packets during the loopback test. The value may be associated with a parameter related to the set of packets. The device may perform the loopback test using the set of packets. A header of the set of packets may be configured with a same value for a same parameter as the value configured in the data structure. The device may identify the source of the communication error based on a result of performing the loopback test. The device may perform an action related to addressing the communication error based on identifying the source of the communication error.

20 Claims, 6 Drawing Sheets

ISOLATING SERVICE FAULTS USING LOOPBACKS

BACKGROUND

Loopback, or loop-back, may refer to the routing of electronic signals, digital data streams, or flows of items back to a source without intentional processing or modification. Loopback may permit testing of a transmission performance of one or more electronic devices, and/or a transportation infrastructure (e.g., communications network).

SUMMARY

According to some possible implementations, a device may include one or more processors to receive an indication to perform a loopback test to identify a source of a communication error associated with a set of links among a set of devices. The one or more processors may configure a value in a type-length-value (TLV) element to permit or cause an action to be performed with respect to a set of packets based on the value. The value may be associated with a parameter associated with the set of packets. The value may be used to identify the set of packets during the loopback test. The one or more processors may perform the loopback test using the set of packets. A header of the set of packets may be configured with a same value for a same parameter as the value configured in the TLV element. The one or more processors may identify the source of the communication error based on a result of performing the loopback test. The one or more processors may perform another action related to fixing the communication error based on identifying the source of the communication error.

According to some possible implementations, a non-transitory computer-readable medium may store one or more instructions that, when executed by one or more processors, cause the one or more processors to receive an indication to perform a loopback test using a set of packets. The loopback test may be used to identify a source of a communication error associated with a set of links among a set of devices. The one or more instructions, when executed by the one or more processors, may cause the one or more processors to configure a value in a type-length-value (TLV) element to permit or cause an action to be performed with respect to the set of packets. The value may be used to determine whether the set of packets is to be looped back during the loopback test. The value may be associated with a parameter related to the set of packets.

The one or more instructions, when executed by the one or more processors, may cause the one or more processors to perform the loopback test using the set of packets. A header of the set of packets may be configured with a same value for a same parameter as the value configured in the TLV element. The one or more instructions, when executed by the one or more processors, may cause the one or more processors to identify the source of the communication error based on a result of performing the loopback test. The one or more instructions, when executed by the one or more processors, may cause the one or more processors to perform another action related to addressing the communication error based on identifying the source of the communication error.

According to some possible implementations, a method may include receiving, by a device, an indication to perform a loopback test to identify a source of a communication error among a set of devices. The method may include configuring, by the device, a value in a data structure to permit identification of a set of packets during the loopback test. The value may be associated with a parameter related to the set of packets. The method may include performing, by the device, the loopback test using the set of packets. A header of the set of packets may be configured with a same value for a same parameter as the value configured in the data structure. The method may include identifying, by the device, the source of the communication error based on a result of performing the loopback test. The method may include performing, by the device, an action related to addressing the communication error based on identifying the source of the communication error.

DETAILED DESCRIPTION

The following detailed description of example implementations refers to the accompanying drawings. The same reference numbers in different drawings may identify the same or similar elements.

A network of network devices may be experiencing communication errors on a set of links among the network devices. For example, the network devices may be experiencing congestion on the set of links, dropped packets, a bit rate that fails to satisfy a threshold, jitter, and/or the like. A network administrator associated with the network may want to perform a set of loopback tests on the set of links to identify a source of the communication errors. Although performing the set of loopback tests may permit the network administrator to identify a source of the communication errors, the set of loopback tests may disrupt all communications on the set of links, including communications that are not experiencing communication errors (e.g., some layer two communications, of the Open Systems Interconnection (OSI) model, may be experiencing communication errors while other layer two communications on the same link are not experiencing communication errors). This may negatively impact a performance of a network.

Some implementations, described herein, provide a network device to configure a type-length-value (TLV) element in a manner that permits another network device, on which a loopback test is being performed, to determine whether to loop back a packet to the network device, to provide the packet to a destination, or to perform another action related to the packet after receiving the packet from the network device. In this way, the network device may permit another network device to dynamically and selectively loop back a packet for a loopback test without looping back all packets received from the network device. This reduces or eliminates disruptions to communications during performance of a loopback test, thereby improving communications among a set of network devices during a loopback test. In addition, this permits the network device to test particular layer two communications, or communications of other layers, without disrupting all layer two, or other layer, communications, thereby improving a test of layer two, or other layer, communications.

Figure 1A:
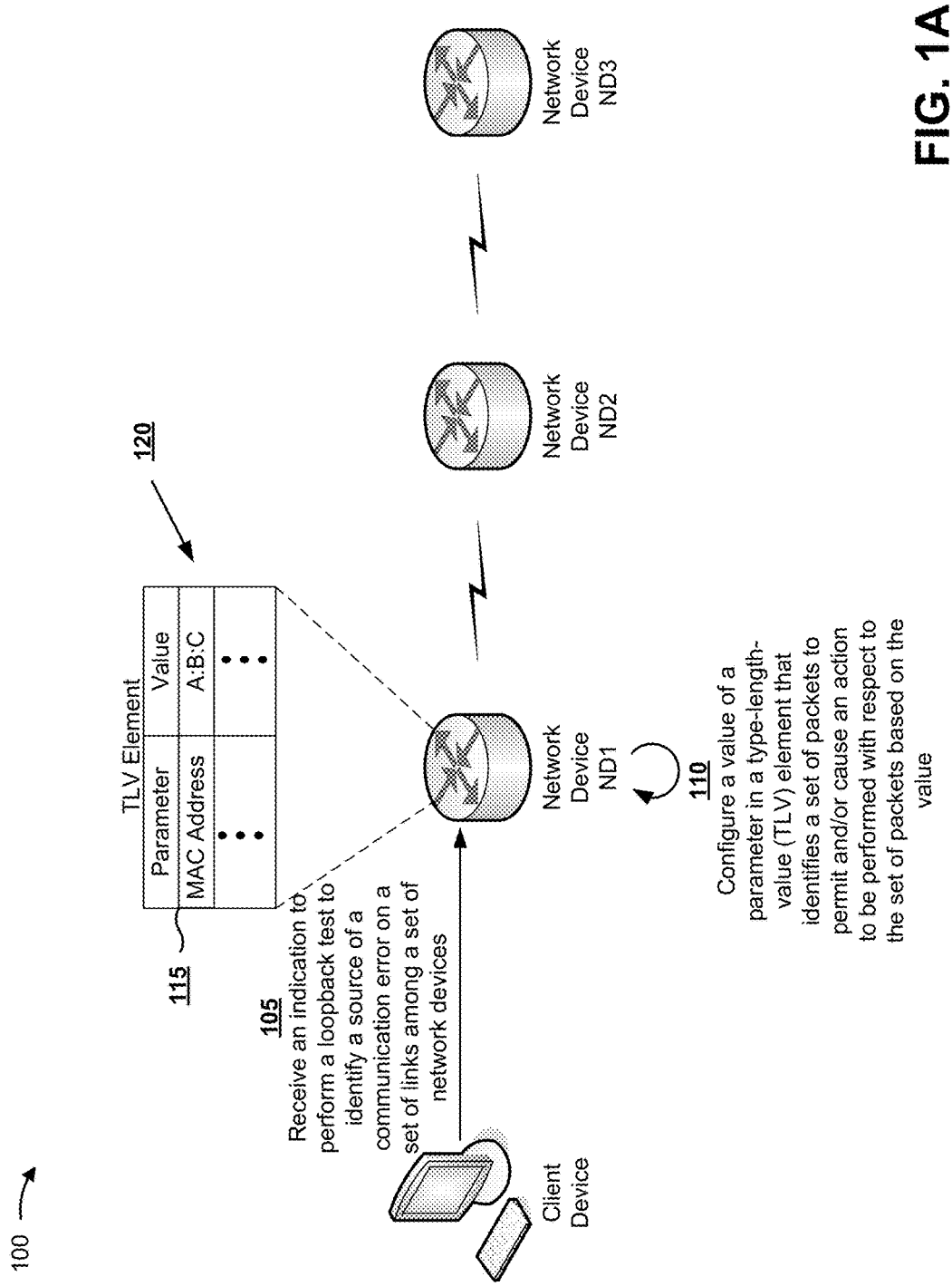
FIGS. 1A-1C are diagrams of an overview of an example implementation described herein.
Figure 1B:
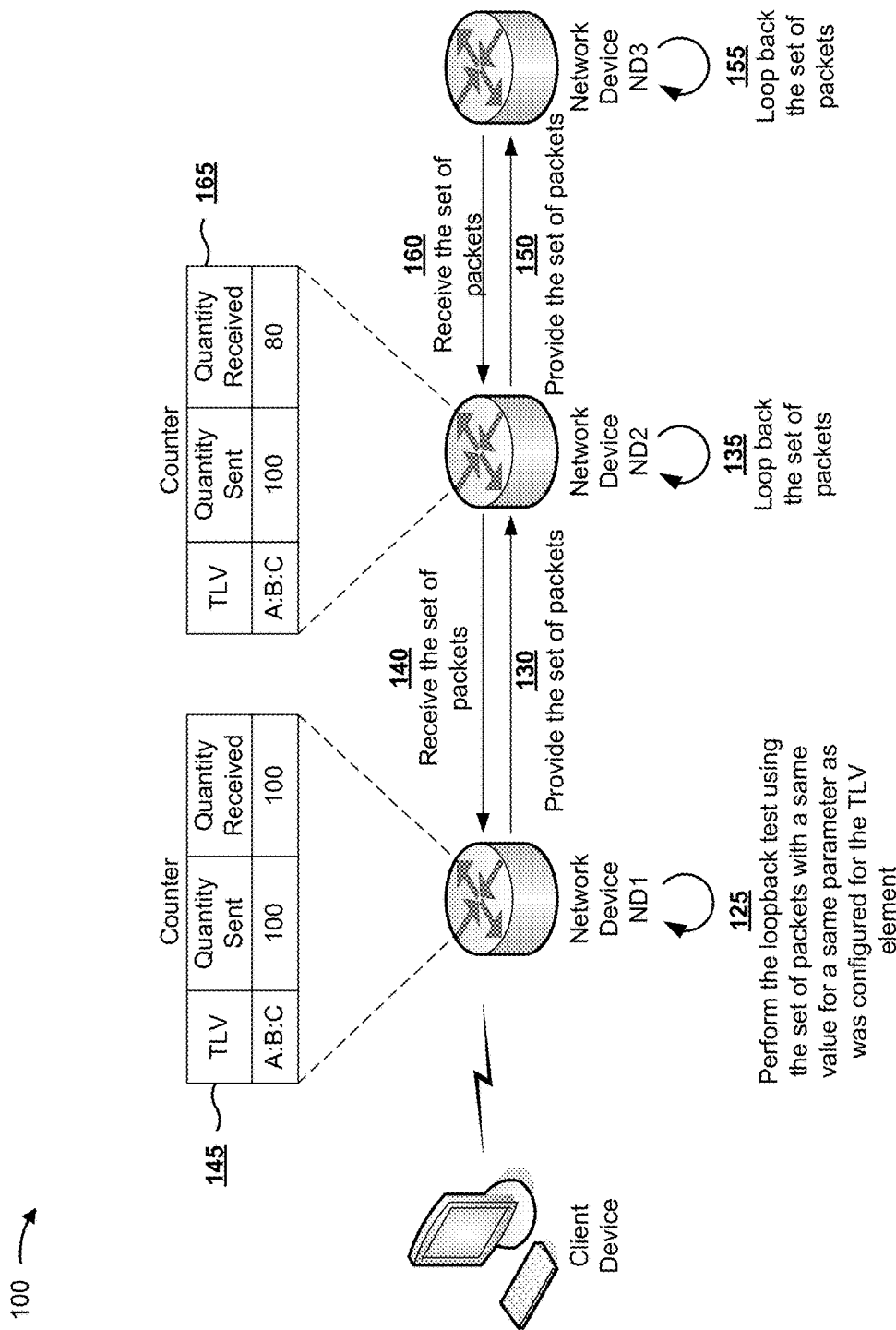
Figure 1C:
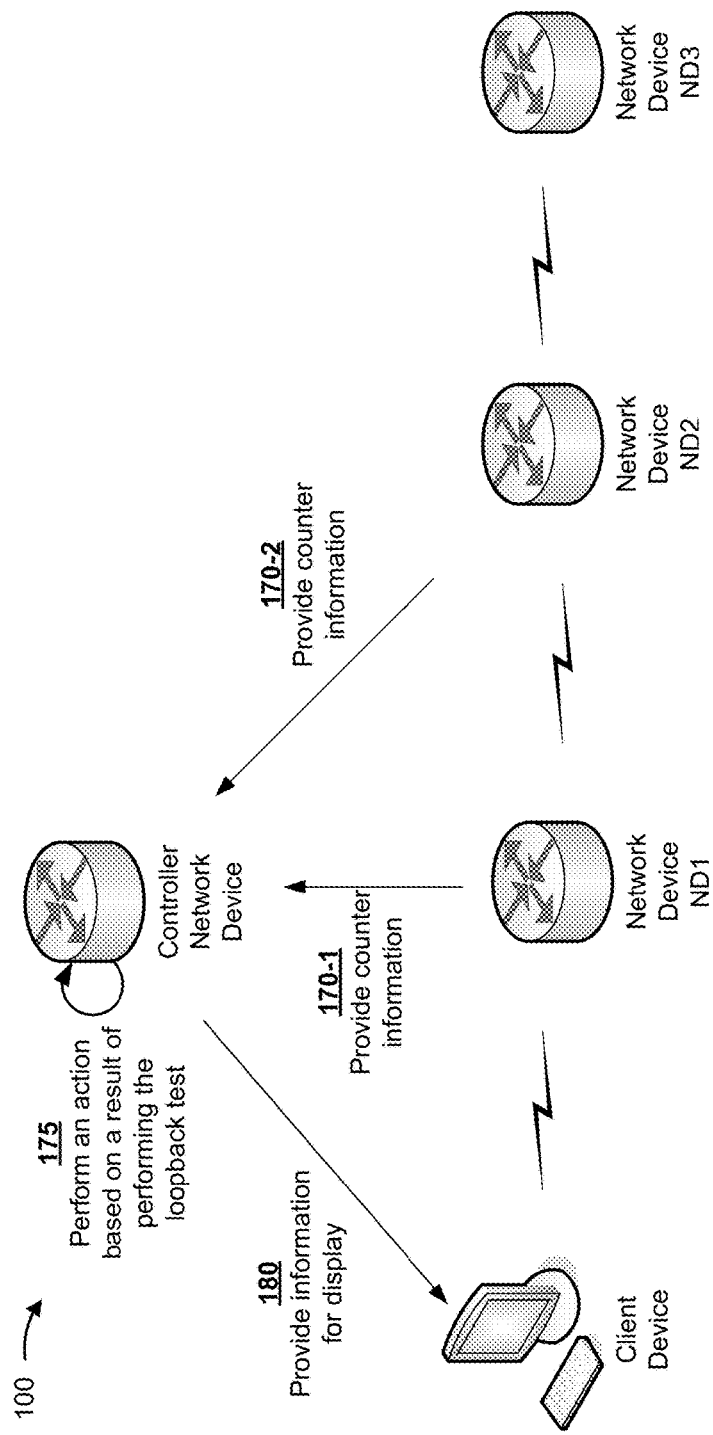

FIGS. 1A-1C are diagrams of an overview of an example implementation 100 described herein. For illustration, implementation 100 includes a client device, and three network devices, shown as network devices ND1, ND2, and ND3. Although FIGS. 1A-1C show a single client device and three network devices, in practice, there may be thousands, millions, billions, etc. of client devices and/or network devices.

As shown in FIG. 1A, and by reference number 105, network device ND1 may receive an indication, from the client device (e.g., based on input from a user of the client device), to perform a loopback test to identify a source of a communication error on a set of links among a set of network devices (e.g., network devices ND1 through ND3). Network device ND1 may receive the indication based on detecting a communication error on a link among network devices ND1, ND2, and ND3. A communication error may include congestion, packet loss, jitter, a bit rate that fails to satisfy a threshold, and/or the like. Although FIG. 1A shows network device ND1 receiving the indication, any one of network devices ND1, ND2, and/or ND3 may receive the indication to perform the loopback test.

As shown by reference number 110, network device ND1 may configure a value of a parameter in a type-length-value (TLV) element that identifies a set of packets to permit and/or cause an action to be performed with respect to the set of packets based on the value. Network device ND1 may configure the TLV with information identifying a parameter, such as a media access control (MAC) address, an Internet protocol (IP) address, information identifying a specific protocol being used (e.g., IP, transmission control protocol (TCP), border gateway protocol (BGP), and/or the like), a port identifier used to provide and/or receive communications, an EtherType, and/or the like.

In some implementations, the value of the parameter in the TLV element may indicate that the packet is to be looped back in association with a loopback test. Conversely, the value of the parameter in the TLV element may indicate that the packet is not to be looped back as part of a loopback test. In this way, network devices ND1 through ND3 may use a value of a TLV to determine which packets are to be looped back in association with a loopback test.

Network device ND1 may provide a set of instructions to network device ND2 indicating whether the value of the parameter in the TLV element indicates that the packet is to be looped back. In addition, network device ND2 may provide a similar set of instructions to network device ND3. Additionally, or alternatively, network device ND1 may provide information indicating the value of the parameter in the TLV element that network device ND1 is configuring, thereby permitting network device ND2 to configure a TLV element stored by network devices ND2 with the same value that network device ND1 configured. In addition, network device ND2 may provide similar information to network device ND3.

Network device ND1 may store (e.g., in a table, a list, a data structure, etc.), the TLV element. For example, and as shown by reference number 115, network device ND1 may store information identifying a parameter for which a value is being configured in the TLV element. In addition, network device ND1 may store information identifying the value of the parameter in the TLV element. As shown by reference number 120, network device ND1 may configure the TLV element with information identifying a MAC address as the parameter to be used to determine whether to loop back a packet and that the value for the parameter is "A:B:C."

As shown in FIG. 1B, and by reference number 125, network device ND1 may perform the loopback test using the set of packets with a same value for a same parameter as was configured for the TLV element. For example, network device ND1 may perform the loopback test using a set of packets that includes information in a header of the set of packets identifying "A:B:C" as a MAC address associated with the set of packets.

As shown by reference number 130, network device ND1 may provide the set of packets to network device ND2 in association with a loopback test. In some implementations, network device ND1 may provide thousands, millions, billions, etc., of packets when providing the set of packets. Additionally, or alternatively, network device ND1 may provide packets not associated with the loopback test (e.g., packets that are associated with other communications). For example, network device ND1 may provide packets that do not have the same value for the same parameter that network device ND1 configured for the TLV element (e.g., packets that include information in a header of the packets identifying a different MAC address than "A:B:C").

As shown by reference number 135, network device ND2 may loop back the set of packets. For example, network device ND2 may loop back the set of packets that have the same value for the same parameter as was configured for the TLV element (e.g., the set of packets configured with information in a header of the set of packets identifying "A:B:C" as the MAC address associated with the set of packets). In this way, network device ND2 may loop back a portion of the packets received from network device ND1.

As shown by reference number 140, network device ND1 may receive the set of packets that was looped back by network device ND2 (e.g., when, or based on, monitoring a link to receive a portion of the set of packets). As shown by reference number 145, network device ND1 may record information related to the set of packets provided to network device ND2 with the same value for the same parameter as was configured for the TLV element (e.g., using a counter). For example, network device ND1 may record that for MAC address "A:B:C," a quantity of packets sent by network device ND1 to network device ND2 was 100, and a quantity of packets received by network device ND1 after network device ND2 looped back the set of packets was 100. In this way, network device ND1 may record information related to the set of packets provided to, and looped back by, network device ND2, thereby permitting network device ND1 to determine whether a source of a communication error is on a link between network devices ND1 and ND2.

As shown by reference number 150, network device ND2 may provide the set of packets to network device ND3. In some implementations, network device ND2 may provide the set of packets with the same value for the same parameter as was configured for the TLV element (e.g., a set of packets associated with MAC address "A:B:C"), so as to test a link between network devices ND2 and ND3 for a communication error. Additionally, or alternatively, network device ND2 may provide packets, that were received from network device ND1, but that are not associated with the loopback test so that the packets can be provided to a destination (e.g., a device other than network devices ND1 through ND3). In this way, other communications may be uninterrupted by the loopback test.

As shown by reference number 155, network device ND3 may loop back the set of packets. Network device ND3 may loop back packets received from network device ND2 that have the same value for the same parameter as was configured for the TLV element (e.g., packets associated with MAC address "A:B:C"). Network device ND3 may provide packets not associated with the loopback test toward a destination, such as another network device (not shown), thereby reducing or eliminating disruptions to communications during a loopback test.

As shown by reference number 160, network device ND2 may receive the set of packets that was looped back by network device ND3. As shown by reference number 165, network device ND2 may record information identifying a quantity of packets provided to network device ND2 with the same value for the same parameter as was configured for the TLV element (e.g., using a counter). For example, network device ND2 may record information that identifies that for MAC address A:B:C, network device ND2 sent 100 packets to network device ND3, and that network device ND2 received 80 packets from network device ND3 when network device ND3 looped back the set of packets. In this way, network device ND2 may record information that permits a network device to determine if a source of communication errors is on a link between network devices ND2 and ND3. For example, by receiving fewer packets from network device ND3 than were provided to network device ND3, a network device, such as a controller network device (not shown in FIG. 1B) and/or network device ND2, may determine that a source of an error is on a link between network device ND2 and network device ND3.

Although FIG. 1B shows network devices ND1 and ND2 performing loopback tests, in some implementations, network devices ND1 and ND2 may perform the loopback tests sequentially or separately. For example, network device ND1 may perform a first loopback test on a link between network devices ND1 and ND2. In some implementations, if a result of the first loopback test fails to indicate an error on a link between network devices ND1 and ND2, then network device ND2 may perform a second loopback test on a link between network device ND2 and network device ND3. This conserves processing resources of network devices by reducing or eliminating a need for network devices to perform loopback tests when another network device identifies a source of a communication error.

As shown in FIG. 1C, and by reference numbers 170-1 and 170-2, network devices ND1 and ND2 may provide counter information to a controller network device. The counter information may identify a quantity of packets sent by network device ND1 to network device ND2 and by network device ND2 to network device ND3 and a quantity of packets received by network device ND1 from network device ND2 when the set of packets was looped back by network device ND2 and a quantity of packets received by network device ND2 from network device ND3 when the set of packets was looped back by network device ND3. The counter information may permit the controller network device to determine a source of an error related to communications among multiple network devices, including network devices with which the controller network device is not communicating. In practice, the controller network device may receive counter information from hundreds, thousands, millions, etc. of network devices. In this way, the controller network device may receive a data set that cannot be processed manually or objectively by a human actor.

As shown by reference number 175, the controller network device may perform an action based on a result of performing the loopback test. For example, the controller network device may determine a source of communication errors. Continuing with the previous example, the controller network device may identify a link between network device ND2 and network device ND3 as a source of one or more communication errors (e.g., based on the counter information indicating that network device ND2 received fewer packets from network device ND3 than were sent to network device ND3). Additionally, or alternatively, and continuing still with the previous example, the controller network device may identify network device ND3 as a source of a communication error based on network device ND2 receiving fewer looped back packets from network device ND3 than network device ND2 provided to network device ND3.

Additionally, or alternatively, and as another example, the controller network device may boot up another network device and/or power down network device ND3 to fix, or address, the communication error (e.g., cause the other device to boot up and/or cause network device ND3 to power down). Additionally, or alternatively, and as another example, the controller network device may disable a link between network device ND2 and network device ND3 and/or activate another link between network device ND2 and network device ND3.

As shown by reference number 180, and as another example, the controller network device may provide information for display via the client device. The information provided by the controller network device for display may identify a source of the communication error to permit a network administrator to fix, or address, the communication error.

In this way, a network device may permit another network device to dynamically and selectively loop back a packet for a loopback test without looping back all packets received from the network device. This reduces or eliminates disruptions to communications during a loopback test, thereby improving communications among a set of network devices during a loopback test. In addition, this permits the network device to test particular layer two communications, or communications of other layers, without disrupting all layer two, or other layer, communications, thereby improving a test of layer two, or other layer, communications.

As indicated above, FIGS. 1A-1C are provided merely as an example. Other examples are possible and may differ from what was described with regard to FIGS. 1A-1C. Although FIGS. 1A-1C describe network device ND1 as being in communication with network device ND2 and network device ND2 as being in communication with network device ND3, in some implementations, network device ND1 may be in communication with network device ND2 and/or network device ND3.

Figure 2:
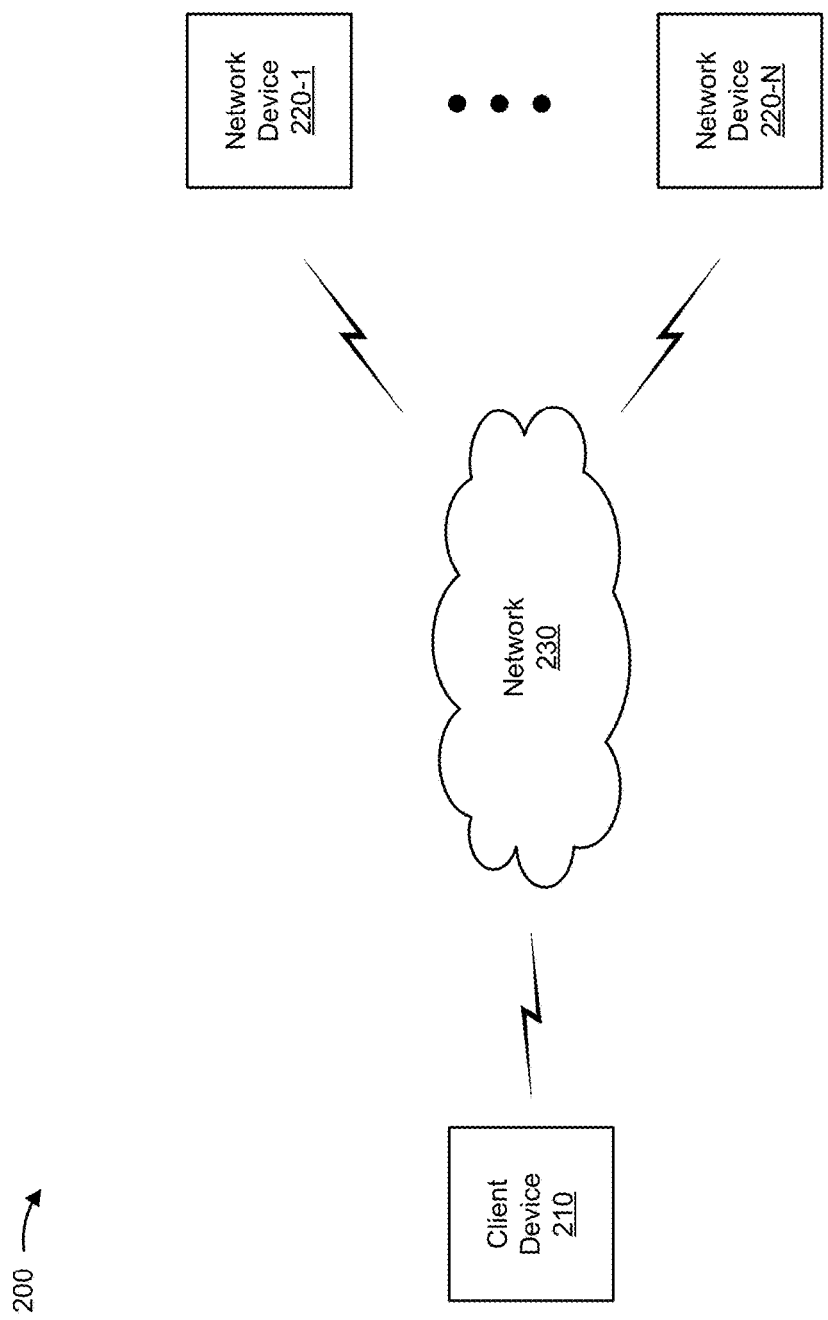
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, one or more network devices 220-1 through 220-N (N≥1) (hereinafter referred to collectively as "network devices 220," and individually as "network device 220"), and a network 230. Devices of environment 200 may interconnect via wired connections, wireless connections, or a combination of wired and wireless connections.

Client device 210 includes one or more devices capable of receiving, generating, storing, processing, and/or providing information associated with a communication error on a link between multiple network devices 220. For example, client device 210 may include a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may receive information related to a source of a communication error on a link among multiple network devices 220, as described elsewhere herein. Additionally, or alternatively, client device 210 may provide the information for display related to a source of an error on a link among multiple network devices 220, as described elsewhere herein. Although FIG. 2 shows a single client device 210, in practice, there may be hundreds, thousands, etc. of client devices 210.

Network device 220 includes one or more devices (e.g., one or more traffic transfer devices) capable of receiving, generating, storing, processing, and/or providing information related to a communication error on a link among multiple network devices 220. For example, network device 220 may include a firewall, a router, a gateway, a switch, a hub, a bridge, a reverse proxy, a server (e.g., a proxy server), a security device, an intrusion detection device, a load balancer, or a similar device. In some implementations, network device 220 may configure a TLV element with information identifying a parameter related to a packet, as described elsewhere herein. Additionally, or alternatively, network device 220 may perform a loopback test on a link among multiple network devices 220 using packets configured with the same information as was configured in the TLV element, as described elsewhere herein. In some implementations, network device 220 may be a physical device implemented within a housing, such as a chassis. In implementations, network device 220 may be a virtual device implemented by one or more computer devices of a cloud computing environment or a data center.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
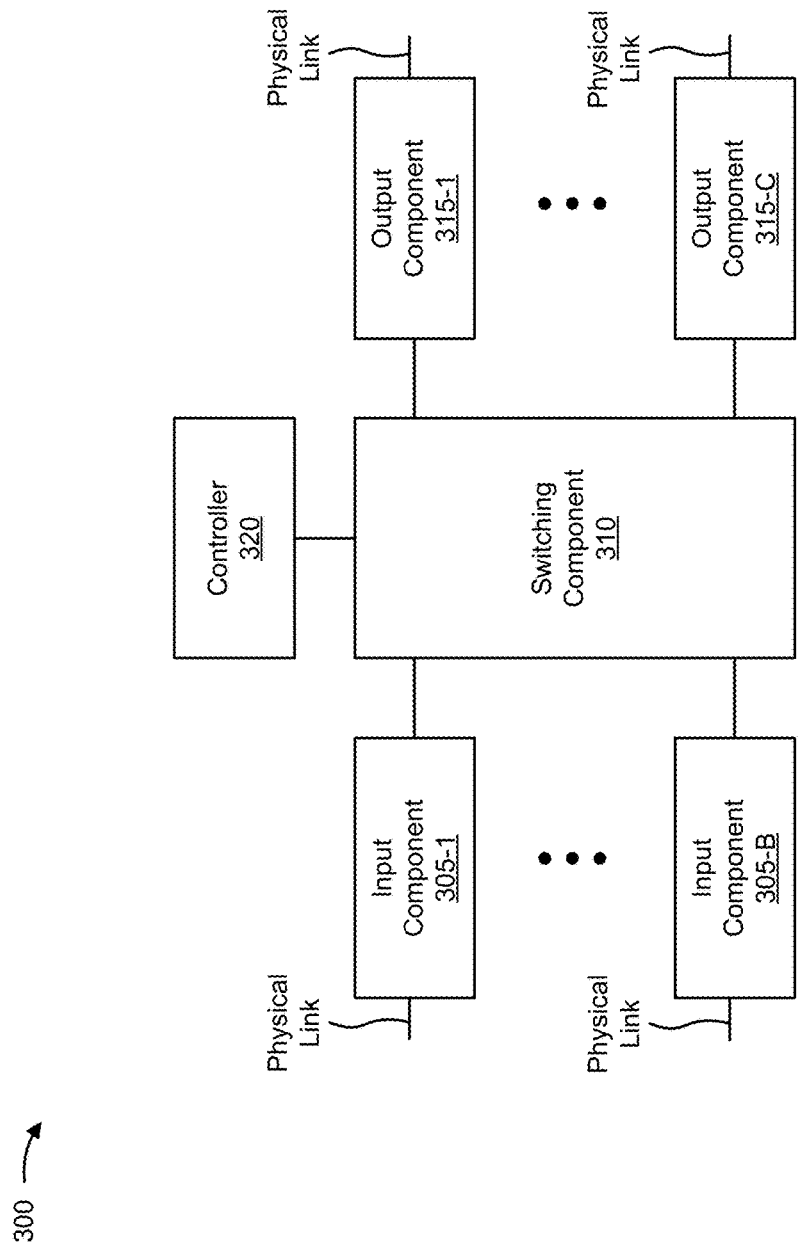
FIG. 3 is a diagram of example components of one or more devices of FIG. 2.

FIG. 3 is a diagram of example components of a device 300. Device 300 may correspond to client device 210 and/or network device 220. In some implementations, client device 210 and/or network device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
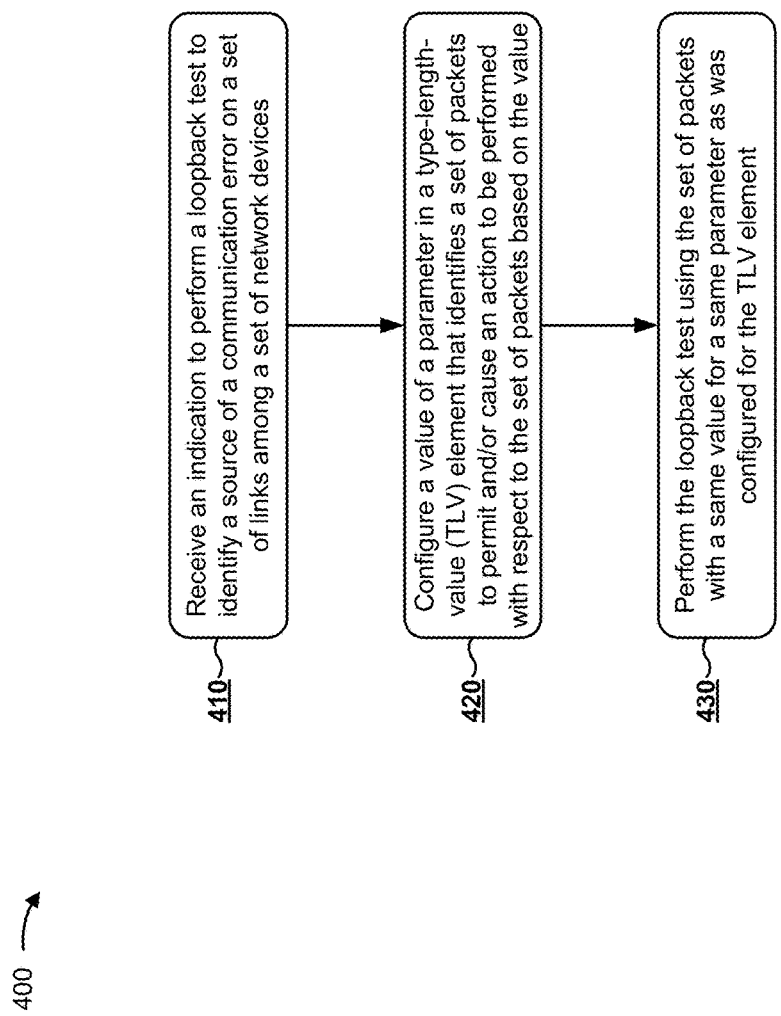
FIG. 4 is a flow chart of an example process for isolating service faults using loopbacks.

FIG. 4 is a flow chart of an example process 400 for isolating service faults using loopbacks. In some implementations, one or more process blocks of FIG. 4 may be performed by network device 220. In some implementations, one or more process blocks of FIG. 4 may be performed by another device or a group of devices separate from or including network device 220, such as client device 210.

As shown in FIG. 4, process 400 may include receiving an indication to perform a loopback test to identify a source of a communication error on a set of links among a set of network devices (block 410). For example, network device 220 may receive an indication to perform a loopback test to identify a source of a communication error on a set of links among a set of network devices 220.

In some implementations, network device 220 may receive an indication periodically, according to a schedule, based on requesting an indication, based on input from a user of client device 210, based on detecting a communication error on a link between two or more network devices 220 (e.g., congestion on the set of links, dropped packets, a bit rate that fails to satisfy a threshold, jitter, etc.), and/or the like. As a specific example, network device 220 may detect a communication error on a link and may generate an indication based on detecting the communication error (e.g., may generate an indication that identifies the communication error). In some implementations, a set of network devices 220 may include hundreds, thousands, millions, etc., of network devices 220. In this way, network device 220 may receive an indication to perform a loopback test on a set of network devices 220 that cannot be tested manually or objectively by a human actor.

In some implementations, a loopback test may be a test of a link where packets are sent from a first network device 220 to a second network device 220, and the second network device 220 sends the packets back (e.g., loops the packets back) to the first network device 220 rather than providing the packets to a third network device 220 and/or toward another destination.

In some implementations, network device 220 may receive information identifying particular packets to test using the loopback test. For example, network device 220 may receive information identifying a particular parameter that is to be used to identify packets to be looped back and/or packets that are not to be looped back. In some implementations, a parameter may include a MAC address, an IP address, information identifying a specific protocol (e.g., IP, TCP, BGP, etc.), a port identifier, an EtherType, and/or the like. In some implementations, network device 220 may receive information identifying packets to be used for multiple loopback tests. In this way, network device 220 may be capable of performing multiple loopback tests (e.g., to be performed simultaneously, at different times, etc.), thereby increasing an efficiency of performing multiple loopback tests to identify a source of a communication error or sources of multiple communication errors (e.g., relative to receiving information related to a single loopback test).

In some implementations, a packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via network 230. In some implementations, traffic may refer to a set of packets.

In this way, network device 220 may receive an indication to perform a loopback test to identify a source of a communication error on a set of links among a set of network devices 220, prior to network device 220 configuring a value for a TLV element that is to be used to identify a set of packets.

As further shown in FIG. 4, process 400 may include configuring a value of a parameter in a type-length-value (TLV) element that identifies a set of packets to permit and/or cause an action to be performed with respect to the set of packets based on the value (block 420). For example, network device 220 may configure a value of a parameter in a TLV element that identifies a set of packets to permit and/or cause an action to be performed with respect to the set of packets based on the value.

In some implementations, network device 220 may determine a value of a parameter to configure in the TLV element. In some implementations, network device 220 may determine a value of a parameter to configure based on the received indication (e.g., where the indication includes information identifying the value). Additionally, or alternatively, network device 220 may determine a value of a parameter to configure based on a communication error that network device 220 detects. For example, network device 220 may determine that particular packets are being dropped (e.g., packets that have a particular value for a particular parameter in a header of the packet). Continuing with the previous example, network device 220 may determine to configure the same value as is included in the headers of the dropped packets.

Additionally, or alternatively, network device 220 may determine a value to configure based on historical information identifying historical communication errors. For example, network device 220 may determine a value to configure by determining that a detected communication error is similar to a historical communication error (e.g., based on types of packets being dropped, network devices 220 that are experiencing disrupted communications, etc.).

In some implementations, network device 220 may configure information identifying a value for a parameter in a TLV element (e.g., a TLV element stored by network device 220). For example, network device 220 may configure information identifying a determined value. Additionally, or alternatively, network device 220 may configure information identifying a value for a parameter in a data structure (e.g., a data structure stored by network device 220). In some implementations, network device 220 may configure information identifying a parameter for which the value is configured. For example, network device 220 may determine to configure a TLV element with information identifying a value as a particular parameter, such as a MAC address, when network device 220 determines to configure the TLV element with a MAC address. In some implementations, network device 220 may configure the same TLV element with the information identifying the particular parameter as was configured with a value for the parameter.

In some implementations, network device 220 may initiate a counter. For example, network device 220 may initiate a counter to record a quantity of packets provided and/or received during the loopback test that have the same value for a parameter as was configured for the TLV element. In some implementations, the counter may be associated with the value that network device 220 configured in the TLV. For example, network device 220 may use the counter to record a quantity of packets provided and/or received that have the value configured in a header of the packet.

In some implementations, network device 220 may provide information identifying the value that network device 220 configured in the TLV to other network devices 220. For example, network device 220 may provide information identifying the value to other network devices 220 on which loopback tests are to be performed and information identifying whether the value identifies a set of packets to be looped back or a set of packets to be provided toward a destination. This permits other network devices 220 to determine which packets are to be looped back in association with a loopback test. In some implementations, network device 220 may provide a set of instructions to other network devices 220 to configure a TLV and/or to initiate a counter in a similar manner. In this way, network devices 220 that are to be included in a loopback test may be capable of recording metrics that permit determination of a source of a communication error.

In some implementations, the value that network device 220 configured in the TLV element may indicate that a packet with the same value for the same parameter in a header of the packet is to be looped back to the particular network device 220 that provided the packet. For example, a first network device 220 may use the value to identify a packet that is to be looped back to a second network device 220 that provided the packet (e.g., without disrupting other packets associated with other communications). Continuing with the previous example, network device 220 may loop back packets that have the same value for the same parameter.

Conversely, and in some implementations, the value that network device 220 configured in the TLV element may indicate that a packet with the same value for the same parameter in a header of the packet is not to be looped back (e.g., is to be provided to another network device 220, provided toward a destination, etc.). For example, a first network device 220 may use the value to identify a packet that is not to be looped back to a second network device 220 as part of a loopback test. Continuing with the previous example, network device 220 may loop back packets that do not have the same value for the same parameter. In this way, configuring a value in the TLV element permits network device 220 to test particular communications using a loopback test without interrupting other communications.

In this way, network device 220 may configure a value of a parameter in a TLV element that identifies a set of packets to permit and/or cause an action to be performed with respect to the set of packets based on the value, prior to performing a loopback test.

As further shown in FIG. 4, process 400 may include performing the loopback test using the set of packets with a same value for a same parameter as was configured for the TLV element (block 430). For example, network device 220 may perform the loopback test using the set of packets with a same value for a same parameter as was configured for the TLV element.

In some implementations, network device 220 may provide a set of packets to another network device 220. For example, network device 220 may provide a set of packets with the same value for the same parameter as was configured for the TLV element toward another network device 220. Additionally, or alternatively, network device 220 may provide other packets not associated with the loopback test toward another network device 220. For example, network device 220 may provide other packets that have different values for the same parameter as the value configured in the TLV element.

In some implementations, prior to providing a set of packets, network device 220 may configure a header of the set of packets. For example, network device 220 may configure a header such that information included in the header identifies the same value for the same parameter as was configured in the TLV element. In this way, network device 220 may configure a set of packets that can be used to test communications among multiple network devices 220, thereby improving testing of the communications relative to not using a configured set of packets.

In some implementations, when network device 220 receives a set of packets from another network device 220, network device 220 may loop the set of packets back to the other network device 220 (e.g., based on the set of packets having a particular value for a parameter included in a header of the set of packets). For example, a set of packets that network device 220 loops back may be associated with a loopback test used to identify a source of a communication error on a set of links among network devices 220. Additionally, or alternatively, network device 220 may provide the set of packets toward a destination (e.g., based on the set of packets not having a particular value for a parameter included in a header of the set of packets). In this way, network device 220 may use a set of packets in association with a loopback test without disrupting other communications that are not experiencing communication errors.

In some implementations, network device 220 may receive packets after another network device 220 has looped the packets back. For example, network device 220 may monitor a link via which packets were provided so as to receive the packets, or a portion thereof, when another network device 220 loops the packets back and may receive the packets based on monitoring the link. Additionally, or alternatively, network device 220 may record metrics related to the packets (e.g., a quantity of packets sent, a quantity of packets received, whether the packets have errors, a bit rate associated with a set of packets, etc.). For example, network device 220 may record metrics related to packets that have the same value for the same parameter as was configured in the TLV element. Additionally, or alternatively, network device 220 may receive counter information from another network device 220 (e.g., a first network device 220 may receive information identifying a quantity of packets that a second network device 220 provided to, and/or received from, a third network device 220, a bit rate of a set of packets provided to, and/or received from, the third network device 220, etc.). This permits network device 220 to analyze communications among a set of other network devices 220 to identify a source of a communication error.

Additionally, or alternatively, network device 220 may identify a source of a communication error (e.g., using counter information recorded by network device 220 and/or another network device 220). In some implementations, and for example, a mismatch in values for a quantity of packets provided and a quantity of packets received may indicate that a corresponding link via which the packets were provided and/or that the particular network devices 220 associated with the link are a source of a communication error. Additionally, or alternatively, and as another example, network device 220 may identify a source of an error based on values for a combination of metrics.

Additionally, or alternatively, and as another example, network device 220 may identify a source of an error based on a pattern of values for a set of metrics being similar to a pattern associated with a known source of a communication error (e.g., as determined using machine learning). Additionally, or alternatively, and as another example, network device 220 may determine a source of an error based on a trend related to values for a set of metrics (e.g., a trend over time, a trend with respect to a particular network device 220 and/or link, etc.). Additionally, or alternatively, and as another example, network device 220 may identify a source of an error based on a type of error indicated by values for a set of metrics. For example, network device 220 may identify a source of an error based on values for the set of metrics indicating that a link is experiencing a dropped packet error, jitter, a bit rate error, and/or the like.

In some implementations, network device 220 may provide counter information to another device (e.g., a server device and/or client device 210) to permit the other device to identify a source of a communication error. In some implementations, network device 220 may provide information for display via client device 210. For example, network device 220 may provide information indicating a source of a communication error, counter information, values for a set of metrics, and/or the like to client device 210 for display. In some implementations, network device 220 may send a message (e.g., to client device 210) that identifies a source of a communication error, counter information, and/or the like.

In some implementations, network device 220 may perform an action to fix, or address, a communication error. For example, network device 220 may boot up or power down, or cause a boot up or power down of, a network device 220 to fix, or address, the communication error. Additionally, or alternatively, and as another example, network device 220 may determine an alternative route via network 230 (e.g., an alternative set of links) for packets so that the packets avoid a source of a communication error. Additionally, or alternatively, and as another example, network device 220 may activate or deactivate a link among network devices 220. Additionally, or alternatively, and as another example, network device 220 may obtain software for network device 220 and/or another network device 220 and/or may install the software or cause the software to be installed (e.g., by the other network device 220).

Additionally, or alternatively, and as another example, network device 220 may generate a recommendation related to fixing, or addressing, the communication error. Continuing with the previous example, network device 220 may provide information related to the recommendation to client device 210, such as to facilitate fixing, or addressing, of a communication error by a network administrator.

In this way, network device 220 may perform the loopback test using the set of packets with a same value for a same parameter as was configured for the TLV element.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations, described herein, permit a network device to configure a type-length-value (TLV) element in a manner that permits another network device, on which a loopback test is being performed, to determine whether to loop back a packet to the network device, to provide the packet to a destination, or to perform another action related to the packet after receiving the packet from the network device. In this way, the network device may permit another network device to dynamically and selectively loop back a packet for a loopback test without looping back all packets received from the network device. This reduces or eliminates disruptions to communications during a loopback test, thereby improving communications among a set of network devices during a loopback test. In addition, this permits the network device to test particular layer two communications, or communications of other layers, without disrupting all layer two, or other layer, communications, thereby improving a test of layer two, or other layer, communications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
  receive an indication to perform a loopback test to identify a source of a communication error associated with a set of links among a set of devices;
  configure a value in a type-length-value (TLV) element to permit or cause an action to be performed with respect to a set of packets based on the value configured in the TLV element;
    the value configured in the TLV element being associated with a parameter associated with the set of packets;
    the value configured in the TLV element to be used to identify the set of packets during the loopback test;
  provide, to another device, information that identifies the value configured in the TLV element to permit the other device to determine whether the set of packets is to be looped back to the device or provided toward a destination;
  initiate a counter to be used to record, during the loopback test, a set of metrics associated with the set of packets that have a same value for a same parameter as the value configured in the TLV element;
  perform the loopback test, after initiating the counter, using the set of packets,
    a header of the set of packets being configured with a same value for a same parameter as the value configured in the TLV element;
  identify the source of the communication error based on a result of performing the loopback test; and
  perform another action related to fixing the communication error based on identifying the source of the communication error.

2. The device of claim 1, where the one or more processors are further to:
detect the communication error on the set of links; and
where the one or more processors, when receiving the indication, are to:
  receive the indication based on detecting the communication error.

3. The device of claim 1, where the one or more processors are further to:
determine the value to configure in the TLV element; and
where the one or more processors, when configuring the value in the TLV element, are to:
  configure the value in the TLV element after determining the value.

4. The device of claim 1, where the one or more processors, when configuring the value in the TLV element, are to:
configure information identifying the parameter with which the value is associated.

5. The device of claim 1, where the one or more processors are further to:
provide the set of packets toward another device via a link, of the set of links, in association with performing the loopback test; and
monitor the link to receive one or more packets, of the set of packets, after providing the set of packets via the link.

6. The device of claim 1, where the one or more processors, when performing the other action, are to:
determine an alternative route via which to provide a set of communications after identifying the source of the communication error,
  the alternative route to fix the communication error; and
provide the set of communications via the alternative route.

7. The device of claim 1, where the parameter includes:
a media access control (MAC) address,
an Internet protocol (IP) address,
information identifying a protocol associated with the set of packets,
a port identifier, or
an EtherType.

8. A non-transitory computer-readable medium storing instructions, the instructions comprising:
one or more instructions that, when executed by one or more processors of a device, cause the one or more processors to:
  receive an indication to perform a loopback test using a set of packets, the loopback test to be used to identify a source of a communication error associated with a set of links among a set of devices;
  configure a value in a type-length-value (TLV) element to permit or cause an action to be performed with respect to the set of packets based on the value configured in the TLV element,
    the value configured in the TLV element to be used to determine whether the set of packets is to be looped back during the loopback test,
    the value configured in the TLV element being associated with a parameter related to the set of packets;
  provide, to another device, information that identifies the value configured in the TLV element to permit the other device to determine whether the set of packets is to be looped back to the device or provided toward a destination;
  initiate a counter to be used to record, during the loopback test, a set of metrics associated with the set of packets that have a same value for a same parameter as the value configured in the TLV element;
  perform the loopback test using the set of packets,
    a header of the set of packets being configured with a same value for a same parameter as the value configured in the TLV element;
  identify the source of the communication error based on a result of performing the loopback test; and perform another action related to addressing the communication error based on identifying the source of the communication error.

9. The non-transitory computer-readable medium of claim 8, where the one or more instructions, when executed by the one or more processors, further cause the one or more processors to:
determine the value to configure in the TLV element based on receiving the indication to perform the loopback test; and
where the one or more instructions, that cause the one or more processors to configure the value, cause the one or more processors to:
configure the value in the TLV element after determining the value.

10. The non-transitory computer-readable medium of claim 8, where the one or more instructions, when executed by the one or more processors, further cause the one or more processors to:
initiate a counter associated with the value; and
where the one or more instructions, that cause the one or more processors to perform the loopback test, cause the one or more processors to:
perform the loopback test after initiating the counter.

11. The non-transitory computer-readable medium of claim 8, where the one or more instructions, when executed by the one or more processors, further cause the one or more processors to:
provide information identifying the value to a device to permit the device to determine whether the set of packets is to be looped back in association with the loopback test.

12. The non-transitory computer-readable medium of claim 8, where the parameter includes:
a media access control (MAC) address,
an Internet protocol (IP) address,
information identifying a protocol associated with the set of packets,
a port identifier, or
an EtherType.

13. The non-transitory computer-readable medium of claim 8, where the one or more instructions, that cause the one or more processors to perform the other action, cause the one or more processors to:
cause a device to boot up to address the communication error after identifying the source of the communication error, or
cause a device to power down to address the communication error after identifying the source of the communication error.

14. The non-transitory computer-readable medium of claim 8, where the one or more instructions, that cause the one or more processors to perform the loopback test, cause the one or more processors to:
loop back the set of packets to a device,
the set of packets being received from the device.

15. A method, comprising:
receiving, by a device, an indication to perform a loopback test to identify a source of a communication error among a set of devices;
configuring, by the device, a value in a data structure to permit identification of a set of packets based on the value configured in a TLV element during the loopback test,
the value configured in the TLV element to be used to determine whether the set of packets is to be looped back during the loopback test,
the value configured in the TLV element being associated with a parameter related to the set of packets;
providing, to another device, information that identifies the value configured in the TLV element to permit the other device to determine whether the set of packets is to be looped back to the device or provided toward a destination;
initiating a counter to be used to record, during the loopback test, a set of metrics associated with the set of packets that have a same value for a same parameter as the value configured in the TLV element;
performing, by the device, the loopback test using the set of packets,
a header of the set of packets being configured with a same value for a same parameter as the value configured in the data structure;
identifying, by the device, the source of the communication error based on a result of performing the loopback test; and
performing, by the device, an action related to addressing the communication error based on identifying the source of the communication error.

16. The method of claim 15, further comprising:
determining the value based on historical information that identifies historical communication errors associated with a set of links among the set of devices; and
where configuring the value comprises:
configuring the value after determining the value.

17. The method of claim 15, where configuring the value comprises:
configuring information identifying the parameter with which the value is associated.

18. The method of claim 15, further comprising:
initiating a counter to be used to record a set of metrics associated with the set of packets; and
where performing the loopback test comprises:
performing the loopback test after initiating the counter.

19. The method of claim 15, where performing the action comprises:
obtaining software to fix the communication error after identifying the communication error; and
causing the software to be installed after obtaining the software.

20. The method of claim 15, where the parameter includes:
a media access control (MAC) address,
an Internet protocol (IP) address,
information identifying a protocol associated with the set of packets,
a port identifier, or
an EtherType.

* * * * *